Oct. 4, 1932.  W. HEUSSER  1,881,386
CHAIN POISE VARIABLE WEIGHT BALANCE
Filed April 16, 1931
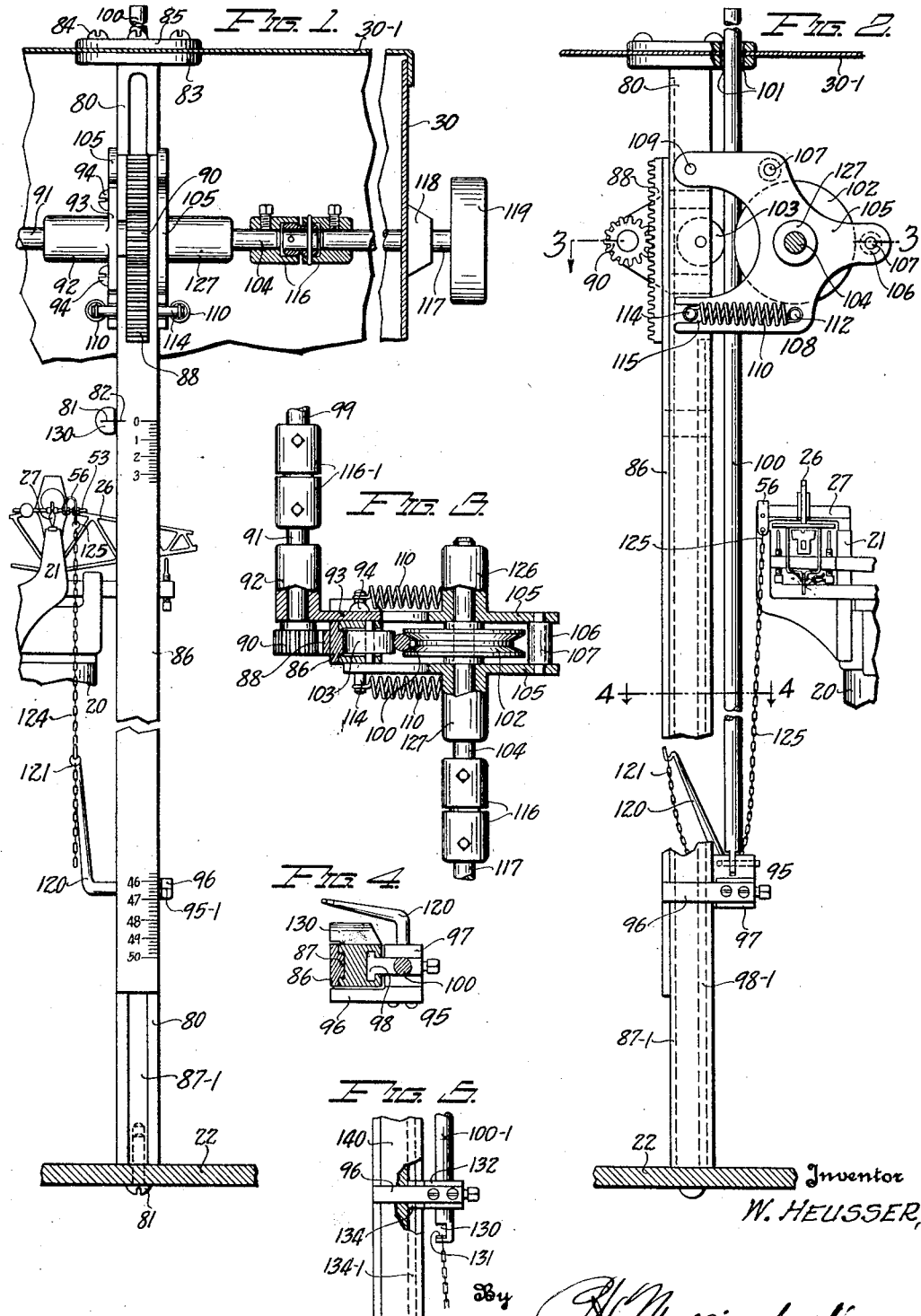
W. HEUSSER, Patented Oct. 4, 1932

1,881,386

UNITED STATES PATENT OFFICE

WILFRID HEUSSER, OF SALT LAKE CITY, UTAH

CHAIN-POISE VARIABLE-WEIGHT BALANCE

Application filed April 16, 1931. Serial No. 530,631.

This invention relates to a chain-poise variable-weight balance, and more particularly, is an improvement upon the variable-weight balance, described and claimed in my U. S. Patent #1,702,006, which was issued February 12, 1929.

In the said patent is described a movable weight scale, a movable weight indicator which registers with this scale, and a system of friction sheaves around which passes a flexible cord to which the weight indicator is attached.

In my present improvement, I eliminate the friction sheaves and flexible cords, and instead, I attach a rigid member, such as a rod, to the weight indicator, and then provide a mechanism for positively moving the rigid member back and forth. Such a mechanism may include a friction wheel, which engages the rod under a spring tension, together with means for conveniently rotating said friction wheel from the outside of the usual balance casing.

The principal objects of the present invention are:

First. To attain rapidity in precise weighing.

Second. To provide maximum convenience for the operator.

Third. To be simple and efficient.

Fourth. To provide a very sensitive, responsive and yet positive, mechanism whereby the operator may smoothly actuate the weight indicator.

Fifth. A convenient mechanism for smoothly actuating the weight scale.

The features of this invention for which the protection of Letters Patent is desired, are collectively grouped in the claims concluding this specification.

In the drawing, which illustrates merely one embodiment of the invention.

Fig. 1 represents a front elevation, partly in section, portions being omitted;

Fig. 2, a side elevation, partly in section, portions being omitted;

Figs. 3 and 4, horizontal sections taken respectively on lines 3—3 and 4—4, in Fig. 2, parts in the background being omitted; and Fig. 5, a fragmentary elevation, showing an alternate construction of the weight indicator rod.

Referring to the drawing, the balance structure proper, may in general be similar to the one represented in the drawings forming part of my aforesaid patent, Number 1,702,006. In this balance structure, the numeral 21 indicates a beam bearing support, 27 a center edge member resting thereon, and 26, a beam rigidly connected to the center edge member. An auxiliary edge member 56 is mounted on a stem 53, which latter is rigidly connected to the center edge member. The beam bearing support is secured on the top of a center column 20, as usual, while the column is secured (not shown) on the usual base 22. The balance may be enclosed by a casing 30, having the top 30—1, as usual.

My improved construction includes a column 80, which is preferably disposed forwardly of and in proximity to the swinging members composed of the beam and its accessories. The column 80, at its lower end, may be fastened to the base 22 by any suitable means, such as a screw 81, while the upper part of the column may be connected to the top 30—1 of the casing by means of a flange 83, secured by screws 84 passing through a washer 85.

Adjustably disposed at the front of column 80, may be a graduated weight scale 86. This weight scale is preferably provided with a dovetail 87 engaging a corresponding dovetail groove formed in the column. The weight scale may have a rack 88 secured thereon, and be actuated through a toothed pinion 90 in mesh with the rack. The pinion may be mounted on a shaft 91 carried in a bearing 92, and this bearing may be an integral part of a bracket 93, the latter being secured to column 80 by any suitable means, such as screws 94. An operating shaft 99 may be connected to pinion shaft 91, by a flexible coupling 116—1 of any suitable kind. The weight scale might be termed a "limb".

A weight indicator 95, consisting for instance of an arm 96 and a block 97, is so disposed as to be movable along the weight scale. For this purpose, block 97 may have a T-head 98 which is slidable in a corresponding groove 98—1, formed in the back face of the column 80. To the upper part of the block 97, may be pivotally connected a rigid actuating member, such as rod 100, this rod extending upwardly through an opening 101, which leaves the rod free to be moved up and down through the top 30—1 of the casing.

At a suitable point along column 80 and high enough so that an indicating mark 95—1 on weight indicator 95, can be made to register with any of the division marks of weight scale 86, is disposed a friction wheel 102, and substantially opposite this wheel, a roller 103, which friction wheel and roller cooperate to hold the rod between them.

The friction wheel 102 is preferably grooved, and is pressed against the rod 100 under a constant tension, so as to exert the proper gripping action on the rod. For this purpose, the friction wheel is rigidly mounted on a shaft 104, journaled in bearings 126 and 127, which latter are secured to a frame 108 consisting of the two oppositely disposed side plates 105. These two side plates may be held apart by spacers 106 and be fastened together by means of pins 107. The frame 108 may be disposed to swing around a pivot 109, which at the same time secures the frame to the column 80.

The tension for the friction wheel 102 may be imparted by springs 110, the springs having one end thereof fastened to the frame by pins 112, and the other end to column 80 by pins 114. Sufficient clearance at 115, between the pins 114 and the frame 108, is provided, so that the full tension of the springs shall be exerted by the friction wheel 102 upon the rod 100, and sufficient clearance is also provided in the opening 101, so as not to impair the exertion of said tension upon the rod.

Shaft 104 may have connected to it by any suitable means, such as a flexible coupling 116, an operating shaft 117, which extends through the casing wall 30, and is carried in a bearing 118. At its outer ends, shaft 117 may carry a thumbwheel 119, so disposed as to be readily grasped by the operator, who, by turning the thumbwheel, causes friction wheel 102 to actuate rod 100. Shaft 99 may extend through the other side wall (not shown) of the casing, and on the outside of the casing be provided with a thumbwheel (not shown) similar to 119, through which, the operator imparts motion to limb 86.

The block 97 carries an arm 120 to which is attached the lower end 121 of a weight chain 124, the upper end of the chain having a hook 125 which hangs on the auxiliary edge member 56 in a manner exactly similar to that described in Patent Number 1,702,006.

Sufficient friction exists between the different operating parts so that the weight scale 86 will be retained precisely in any position in which it is left by stoppage of pinion 90, and so that weight indicator 96 will be retained precisely in any position where it is left by any stoppage of the friction wheel 102.

It is to be noted that the means provided, both for imparting motion to the weight scale and to the weight indicator, are extremely convenient and positive in operation, besides having great sensitivity and smoothness of action.

A member 130 projects rigidly from column 80 and bears a mark 81 whose purpose is to indicate approximately the middle point of the adjustable movement of the weight scale. A mark 82 on the weight scale registers with mark 81, and such registry denotes that the weight scale is substantially at the middle point of possible travel. This assures a certain latitude of movement of the zero point of the weight scale in either direction, which is desirable when equilibrating the balance.

It will be understood that equilibrating a balance by means of a chain-poise, is a novel feature embodied in the subject of my aforesaid patent, Number 1,702,006. Therefore, I do not herein claim such feature means broadly, but only in combination with actuating devices for the weight scale and weight indicator as at present disclosed.

Another construction of the weight-carrying rod is indicated in Fig. 6, where a notch 130 is cut in a rod 100—1, so as to provide a knife edge 131 for supporting the chain. The lower portion of the rod may be clamped in a shoe 132 having the T-head 134 which engages grooved portions 134—1 in a column 140.

While a specific embodiment of this invention is herein shown and described, various changes can be made therein without departing from the scope of the following claims.

Having fully described my invention, what I claim is:

1. A chain-poise variable weight balance, including in combination, a swinging member, a weight chain having one end thereof carried by said swinging member, a weight scale in operative proximity to said chain, a weight indicator movable along said weight scale, the other end of said weight chain being carried by the weight indicator, a rod extending from said weight indicator, and a friction wheel in operative engagement with said rod.

2. A chain-poise variable weight balance, including in combination, an oscillating beam, a weight chain having one end thereof carried by said beam, a reciprocating rod adapted to carry the other end of said chain, a weight scale disposed to indicate movement of said rod, a stationary roller in contact with said rod, and a friction wheel under spring tension operative to press said rod against said roller.

3. A chain-poise variable weight balance, including in combination, a column, a graduated limb movable along said column, said limb having a rack portion above the graduations, a pinion in mesh with said rack portion, a weight indicator disposed to register with graduations on said limb, a friction member engaging said weight indicator, a friction wheel in engagement with said friction member, a weight chain having one end thereof disposed to move in unison with said weight indicator, and a connection between said end of the weight chain and weight indicator.

4. A variable weight balance, including in combination, an assemblage of oscillating parts, a flexible weight having one end thereof carried by a member of said assemblage, a weight indicator at the other end of said flexible weight, a substantially vertical reciprocative rod disposed to carry said weight indicator, a pivoted frame in proximity to the upper portion of said rod, a friction wheel rotatable in said frame, and a spring operative upon said frame for the purpose of pressing said friction wheel against said rod.

5. A chain-poise variable weight balance, including in combination, a beam, a weight chain having one end thereof carried by said beam, a substantially vertical rod disposed to carry the other end of said chain, a column in proximity to said rod, a frame embracing said column and said rod, said frame being pivoted to said column, a friction wheel rotatable in said frame and in contact with said rod, and a spring extending from said frame to said column.

6. A chain-poise variable weight balance, including in combination, an oscillating beam, a weight chain having one end thereof carried by said beam, a rod disposed to carry the other end of said chain, means for mounting said rod to lift the chain, a weight scale disposed to indicate movements of said rod, and a friction wheel engaging said rod for the purpose of actuating same.

7. A weighing device, including in combination, an oscillating beam, a column having a guideway, a rod having motion along said guideway, a shoe in engagement with said guideway and with said rod, a weight scale disposed in registering relation with said shoe, a friction wheel contacting said rod, means exerting a spring tension upon said friction wheel for the purpose of gripping said rod, and a flexible weight extending from said beam to said rod.

8. A weighing device, including in combination, a supporting structure having a base and a top, a column extending from said top to said base, a weight scale adjustably disposed along said column, a rod substantially parallel to said column and extending through said top, means for reciprocatively mounting the rod, a flexible weight having one end carried by said rod, a friction wheel in contact with said rod, and means for tensioning said friction wheel against said rod.

In testimony whereof, I sign my name hereto.

WILFRID HEUSSER.